US008089904B2

(12) United States Patent
Balasubramaniam et al.

(10) Patent No.: US 8,089,904 B2
(45) Date of Patent: Jan. 3, 2012

(54) LINK INFERENCE IN LARGE NETWORKS BASED ON INCOMPLETE DATA

(75) Inventors: Rajesh Balasubramaniam, Cary, NC (US); James Mark Shaw, Cary, NC (US)

(73) Assignee: OPNET Technologies, Inc., Bethesda, MD (US)

( * ) Notice: Subject to any disclaimer, the term of this patent is extended or adjusted under 35 U.S.C. 154(b) by 623 days.

(21) Appl. No.: 11/829,925

(22) Filed: Jul. 29, 2007

(65) Prior Publication Data

US 2008/0031156 A1 Feb. 7, 2008

Related U.S. Application Data

(60) Provisional application No. 60/821,022, filed on Aug. 1, 2006.

(51) Int. Cl.
*H04L 12/28* (2006.01)

(52) U.S. Cl. ......... 370/254; 370/255; 370/256; 370/351

(58) Field of Classification Search .................. 370/254, 370/356, 331, 401, 393, 392, 465, 474; 709/223, 709/203, 238
See application file for complete search history.

(56) References Cited

U.S. PATENT DOCUMENTS

| | | | |
|---|---|---|---|
| 5,706,440 A | 1/1998 | Compliment et al. | |
| 6,628,623 B1 | 9/2003 | Noy | |
| 2003/0225908 A1* | 12/2003 | Srinivasan et al. | 709/243 |
| 2004/0194094 A1* | 9/2004 | Qiu et al. | 718/100 |
| 2004/0255184 A1* | 12/2004 | Bejerano et al. | 714/4 |
| 2005/0083949 A1* | 4/2005 | Dobbins et al. | 370/395.53 |
| 2005/0111349 A1* | 5/2005 | Vasseur et al. | 370/216 |
| 2005/0213971 A1* | 9/2005 | Amemiya et al. | 398/45 |
| 2006/0031445 A1* | 2/2006 | Rajan et al. | 709/223 |
| 2006/0129582 A1* | 6/2006 | Schiffmann et al. | 707/101 |
| 2006/0133297 A1 | 6/2006 | Quist et al. | |
| 2006/0256733 A1* | 11/2006 | Bejerano | 370/254 |

FOREIGN PATENT DOCUMENTS

WO    WO 98/28306    5/1998

OTHER PUBLICATIONS

Breitbart, Y. et al; "Topology Discovery in Heterogeneous IP Networks: The Netinventory System", IEEE/ACM Transactions on Networking, IEEE/IACM, New York, NY, USA; vol. 12, No. 3, Jun. 2004, pp. 401-414.

(Continued)

*Primary Examiner* — Hassan Phillips
*Assistant Examiner* — Anez Ebrahim
(74) *Attorney, Agent, or Firm* — Robert M. McDermott (57) ABSTRACT

A network is partitioned into a set of independent partitions, and the topology of each partition is determined, then merged to form a topology of the entire network. Preferably, the partitioning is hierarchical, wherein the network is partitioned to form individual VLAN partitions, and each of the VLAN partitions is further partitioned based on the nodes that are simply connected to each port of one or more selected root switches within the VLAN partition. Simple connections to each port are efficiently determined based on an aggregate address forwarding table associated with each node. Ancillary information, such as spanning tree or CDP data, may be used to facilitate efficient partitioning and/or to validate inferences that are made with incomplete information.

42 Claims, 3 Drawing Sheets

OTHER PUBLICATIONS

Lowekamp, B., et al; "Topology Discovery for Large Eternet Networks", Computer Communication Review, ACM, New York, NY, USA, vol. 31, No. 4, Oct. 1, 2001, pp. 237-248.

Yantao, Sun, et al; "The Physical Topology Discovery for Switched Ethernet Based on Connections Reasoning Technique", Communications and Information Technology, 2005, IEEE International Symposium in Beijing, China, Oct. 12-14, 2005, Piscataway, NJ, USA, IEEE, vol. 1, Oct. 12, 2005, pp. 43-45.

* cited by examiner

LINK INFERENCE IN LARGE NETWORKS BASED ON INCOMPLETE DATA

This application claims the benefit of U.S. Provisional Patent Application 60/821,022, filed 1 Aug. 2006.

BACKGROUND AND SUMMARY OF THE INVENTION

This invention relates to the field of network analysis systems, and in particular to a method and system for determining a topology of one or more networks based on information contained in Address Forwarding Tables (AFT) associated with switches of the network.

Effective management of a network generally requires knowledge of the topology of the network. A preferred user interface for visualization and analysis tools generally provides a display of the topology of the network, wherein colors and other graphic features are used to illustrate features and performance characteristics related to the network nodes and their interconnecting links.

In many situations, and particularly when dealing with large and active networks, the information available for determining how the network nodes are operationally connected to each other is incomplete and/or outdated. As new devices are added to a network, to replace or augment existing capabilities, the database that is used to model the network is often not correspondingly updated; as new routes are created, deleted, or modified, either intentionally or unintentionally, the differences between the actual network and the modeled network continue to increase.

Automated systems have been developed to query devices on the network for their current configuration, and this information is used to update and/or regenerate the network model, including a model of the network topology and other models. Of particular note, switching devices are generally configured to maintain "address forwarding tables" (AFT) that identify the port to which messages addressed to each address should be forwarded. These forwarding tables are generally created dynamically; when a message from a new address is received on a given port, the switch adds the new address to the address forwarding table of the given node, based on the assumption that the network is acyclic and the communication path from and to that address is bidirectional. Conventional bridges use algorithms, such as the Ethernet spanning tree algorithm to assure that the network is acyclic, even in the presence of a cyclic physical configuration. By querying all switches in the network for their current address forwarding tables, the current interconnectivity of the switches can be determined by creating a tree structure based on a determination of which ports are directly connected to each other.

"Topology Discovery in Heterogeneous IP Networks", by Breitbart et al., Proceedings of INFOCOM 2000, March 2000, provides a technique for determining network topology when substantially complete address forwarding table information is provided. Breitbart determined that, in an acyclic network, if the union of the AFTs of two ports contains all of the network nodes, and the intersection of the AFTs of these two ports is null, then the two ports must be directly connected to each other.

"Topology Discovery for Large Ethernet Networks", by Lowekamp et al., SIGCOMM'01, August 2001, provides a technique for determining network topology in the absence of complete connectivity data, including the inference of shared link segments that are not explicitly identified in the connectivity data. Lowekamp introduces the term "through set" (TS), which is the set of addresses that are input on a given port and passed through to other ports on the switch. Because the networks are assumed to be acyclic, as is typical of conventional Ethernet bridged networks, these through sets can be used to identify ports that cannot be connected (directly or indirectly) to each other. For ease of reference, the term 'simply connected' is used to indicate that two nodes are connected, either directly to each other, or via one or more intermediate nodes. By a process of elimination, and knowing that messages are passed between a pair of nodes, the ports that must be providing this connectivity can be determined. Lowekamp determined that, in an acyclic network, if the through sets of two ports contain an address in common, then those two ports cannot be simply connected; if a single pair of ports on a pair of communicating switches are found with through sets that do not contain an address in common, they must be simply connected. When one or more direct connections cannot be found to establish the link between ports that are determined to be simply connected, the existence of the link can be inferred, and a 'virtual link' can be added to the topology. If multiple nodes are identified as being simply connected to the same port, a virtual shared segment can be inferred, such as the use of a public (and not-modeled) network from this port to these multiple nodes.

Although Lowekamp's simply-connected determination provides a technique that is more robust for determining network topology than Breitbart's directly-connected determination when complete connectivity data is not available, both Lowekamp's and Breitbart's techniques are computationally demanding, particularly in a complex network comprising hundreds or thousands of switches, each with multiple ports. Additionally, neither Lowekamp nor Breitbart addresses the merging of their techniques with other known link inference techniques and other connectivity tools; and neither addresses the use of additional information, such as the presence of particularly configured virtual local area networks (VLANs), such as protocol-filtered VLANs, or the presence of aggregate links that logically group individual physical links. In like manner, although Lowekamp's technique can accommodate gaps in connectivity information, Lowekamp does not address the absence of connectivity information relative to entire segments of the network. Lowekamp assumes that all nodes are somehow connected, and, correspondingly, sufficient connectivity information is available for linking all nodes via a tree search starting from a root switch.

It would be advantageous to provide a network topology determining method and system that does not require an exhaustive comparison of the through-set of each port on each switch with the through-set of each port on every other switch on the network. It would also be advantageous to provide a network topology determining method and system that achieves efficiencies based on ancillary information related to the port characteristics. It would also be advantageous to assure that the determined topology includes all identified nodes, regardless of their interdependent connectivity.

These advantages, and others, can be realized by a method and system that partitions a network into a set of independent partitions, determines the topology of each partition, then merges the topologies to form a topology of the entire network. Preferably, the partitioning is hierarchical, wherein the network is partitioned to form individual VLAN partitions, and each of the VLAN partitions is further partitioned based on the nodes that are simply connected to each port of one or more selected root switches within the VLAN partition. Simple connections to each port are efficiently determined based on an aggregate address forwarding table associated with each node. Ancillary information, such as spanning tree or CDP data, may be used to facilitate efficient partitioning and/or to validate inferences that are made with incomplete information.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

For the purposes of this disclosure, the term 'node' is used to reference any network element, including routers, switches, bridges, terminals, and so on. The term 'switch' is used to facilitate understanding of this invention by distinguishing nodes that can be configured to receive messages on one port and selectively forward that message to another of its ports. A switch is generally referred to as a port when its function as a switch is immaterial to the topic being discussed.

Figure 1A:
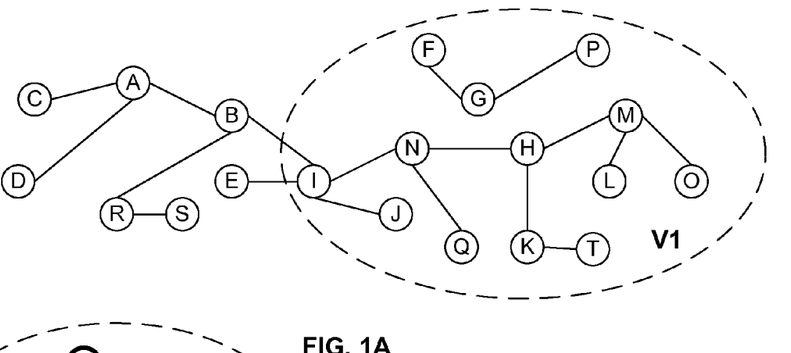
FIGS. 1A-1C illustrate an example partitioning of a network in accordance with this invention.

FIG. 1A illustrates a sample network comprising switches A-T, some of which are members of a virtual network V1. As taught by Lowekamp et al., discussed above, to determine the topology of the network, the Address Forwarding Table (AFT) of the ports of each switch are processed to define Through-Sets (TS) for each port, and the TS for each port is compared with the TS of each other port on another switch, and by "simple iteration, it is possible to map each bridge to the port it appears off every other bridge" (Lowekamp, section 5, ninth paragraph). Even with a network as simple as the one illustrated in FIG. 1A, this combinatorial comparison process could amount to over a thousand comparisons.

In accordance with one aspect of this invention, the network is partitioned into smaller networks to reduce the combinatorial complexity. As a first level of partitioning, each VLAN is processed as a separate entity. Switches that have ports that are not assigned to a VLAN are partitioned together, as if they were members of a common VLAN, herein termed an 'implied virtual network'. Multiple implied virtual networks can be defined, if there are characteristics available to distinguish among different subnetworks of nodes. If, for example, switches that have untagged ports that are assigned to a VLAN, such that a globally significant VLAN identifier is not available, are distinguishable from switches that are not assigned to a VLAN. Within this partition of untagged VLAN ports, ports that support a particular protocol can be distinguished from those that support a different protocol, and different implied virtual network partitions can be defined based on the different protocols supported by the ports.

A single switch can appear in multiple VLAN partitions, depending on the configuration of its ports. In the example of FIG. 1A, switch I includes ports that are members of VLAN V1, and other ports that are members of the implied virtual network partition of non-VLAN ports (hereinafter V0). Thus, switch I is included in both V0 and V1 partitions. Thus, the membership of these two partitions is determined to be:

$$V0: \{A, B, C, D, E, I(3,4), R, S\}; \text{ and}$$

$$V1: \{F, G, H, I(1,2), J, K, L, M, N, O, P, Q, T\}.$$

The I(1,2) and I(3,4) references are used to distinguish the ports of switch I in each partition; for each of the other switches, all of the ports of the switch are within the partition.

By partitioning the original network by VLAN membership and/or other distinguishing features of each port, independent networks are effectively formed. Because each independent network will generally include fewer nodes than the original network, or at least will contain fewer ports than the original, determining the topology of each of these networks will involve fewer combinations that need to be tested, and thus the cumulative time for determining all of the topologies will likely be substantially less than the time to determine the overall network topology directly.

Figure 1B:
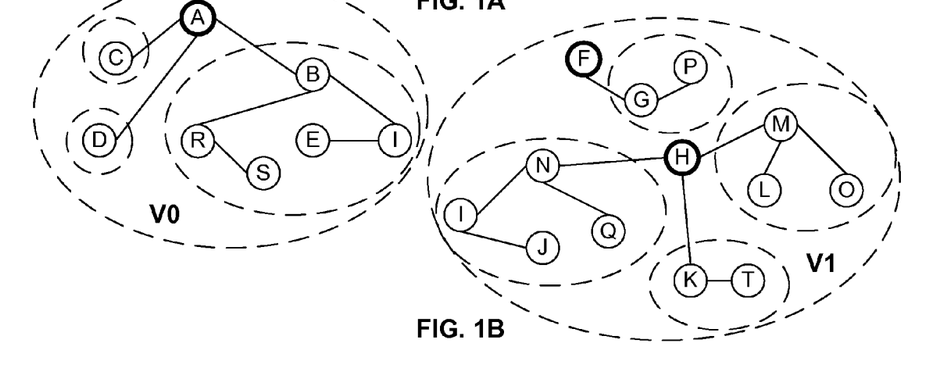

To further reduce the combinatorial complexity, each of these independent networks is further partitioned by identifying the set of nodes that are simply connected to each port of one or more selected 'root-switches' within the partition. In the example of FIGS. 1A-1B, switch A is selected as a first root-switch of network V0. If the address forwarding table of switch A is known to be complete, each simply connected node to each port of switch A will appear in this address forwarding table. However, in actual networks, rarely are forwarding tables known to be complete.

In accordance with a further aspect of this invention, simply connected nodes are determined based on an aggregate address forwarding table associated with each node. As defined herein, the aggregate address forwarding table of a node is the union of the AFTs of each port on the node. It can be shown if any of the following conditions are true, a simple connection must exist between two nodes:

$$\Sigma AFT(i) \cap \Sigma AFT(j) \neq 0$$

$$\Sigma MAC(i) \cap \Sigma AFT(j) \neq 0$$

$$\Sigma AFT(i) \cap \Sigma MAC(j) \neq 0 \tag{1}$$

where:

$\Sigma AFT(i)$ is the aggregation of all the AFT entries in all the ports(i) of the first node;

$\Sigma AFT(j)$ is the aggregation of all the AFT entries in all the ports(j) of the second node;

$\Sigma MAC(i)$ is the aggregation of all the port MAC addresses of all the ports(i) of the first node; and $\Sigma MAC(j)$ is the aggregation of all the port MAC addresses of all the ports(j) of the second node.

That is, if both nodes are configured to send messages to a common node, or if either node is configured to send messages to the other, the nodes must be simply connected to each other.

To take full advantage of the above simplification, in a preferred embodiment of this invention, a 'synonym' table is maintained for tracking duplicate MAC addresses that are assigned to the same port. A common MAC address replaces each occurrence of such synonymous addresses so that these tests, and others can be effectively applied.

Figure 1C:
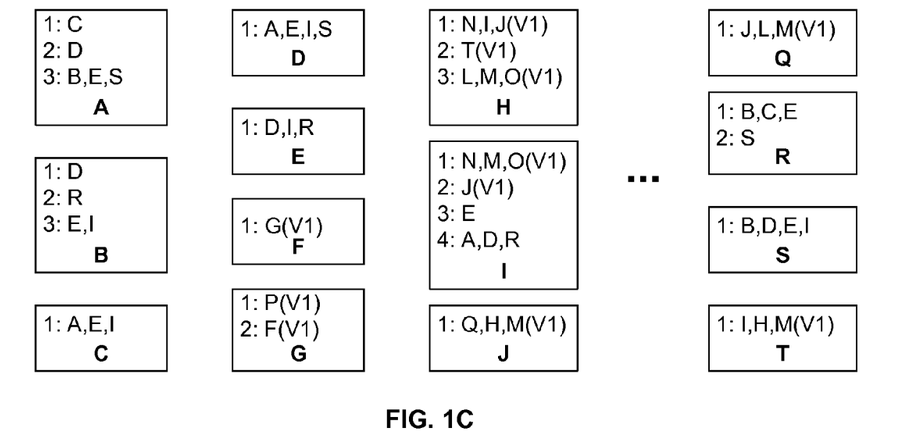

FIG. 1C illustrates an example set of address forwarding tables for switches A-J and Q-T. Applying the above rule set to network V0, we find that root-switch A is simply connected to each of the other nodes in the network V0, even though the address forwarding table of root-switch A does not expressly reference nodes I or R of this network. From the address forwarding tables of root switch A, it is known that node C is on one port, node D is on another, and nodes B, E, and S are on a third port; but it is unknown how nodes I and R are connected to root-switch A.

To determine which port of root-switch A is connected to each of nodes I and R, the Through-Set test of Lowekamp et al., discussed above, can be applied. However, the exhaustive Through-Set test can be bypassed or foreshortened by assessing the address table on each of the simply connected nodes. For example, if each node includes an identification of the other node on one of its ports, these ports must be simply connected. For example, in FIG. 1C, port 2 of switch B addresses switch R, and port 1 of switch R addresses switch B; therefore, port 2 of switch B must be simply connected to port 1 of switch R, and there is no need to apply the Through-Set test. Similarly, if a port of only one of the switches addresses the other, the other ports on that node need not be considered.

From the address tables of switch I, it can be seen that port 4 is used to connect to root-switch A, and thus we only need to compare the through set of this port to each of the ports of root-switch A. Similarly, if a MAC address entry in the address table of switch I can be resolved to a particular port of root-switch A, then it would be known that port 4 of switch I connects to that port of root-switch A, and the Through-Set test would not be required. In this example, the entry in the address table does not resolve itself to a particular port on switch A, and thus the Through-Test of Lowekamp et al. is applied.

The Through-Set of a port is an aggregation of all of the address forwarding tables of the switch except the address forwarding table of this port. Lowekamp et al. have shown that if the intersection of the Through-Set of two ports on different switches is not null, these two ports cannot form a simple connection. If sufficient information is available, the simply connected ports can be found by a process of elimination.

The Through-Set of port 4 of switch I is {E}; that is, we know that data addressed to switch E that is received on port 4 will be routed through switch I from port 4 to port 3. The Through-Set of ports 1, 2, and 3 of switch A are {D, B, E, S}, {C, B, E, S}, and {C, D}, respectively. Of these, only the through-set of port 3 of switch A provides a null intersection with the Through-Set of port 4 of switch I. Because this is the only viable option, we conclude that switch I must be in the set of nodes that are simply connected to port 3 of switch A.

It is unknown which port of switch R is connected to switch A, and thus the Through-Sets of both ports 1 and 2 of switch R, {S} and {B, C, E}, respectively, must be compared to each of the through sets of switch A {D, B, E, S}, {C, B, E, S}, and {C, D}. Because the only null intersection of through sets occurs for port 1 of switch R {S} and port 3 of switch A {C, D}, switch R is also included in the set of nodes that are simply connected to port 3 of switch A.

In like manner, it is known that port 3 of switch A is used to connect to switch B. By comparing only the Through-Sets of port 3 of switch A {C, D} to the Through-Sets of all the ports of switch B {R, E, I}, {D, E, I}, and {D, R}, it can be determined that port 1 of switch B is simply connected to port 3 of switch A.

Each of the ports on the nodes that provide the simple connection to the root-node is defined as the root-port for that node; this designation will subsequently be used to trace the sets of nodes associated with each port of the root-switch, as detailed further below.

Having determined that switches I and R are simply connected to port 3 of switch A, these switches can be added to the address table of port 3 to facilitate further connectivity determinations. In like manner, switch A can be added to the address table of the root-port of each simply connected node B, E, R, S that does not have this entry.

In like manner, virtual network V1 is partitioned by selecting a first root switch, F, and determining all of the nodes that are simply connected to switch F using rule set (1), above. In this example, only nodes G and P will be determined to be simply connected to switch F; and, because switch F has only one port, these nodes form the set of nodes associated with this port of root switch F. Switch G will be added to the address table of this port on switch F, and switch F will be added to the address table of switch P, if not already present.

Because all of the nodes in virtual network V1 have not been assigned to a partition within the network, a second root switch, H, is selected and the above process is repeated to determine that nodes I, J, N, and Q are coupled to port 1 of H; nodes K and T are coupled to port 2; and nodes L, M, and O are coupled to port 3. Each of the address tables of these ports will be augmented to include the newly discovered simple connections, and switch H will be included in the address table of each of the root ports of the simply connected nodes, if not already present. In this example, all of the remaining nodes were associated with a port of root node H, and thus the partitioning of network V1 is complete.

FIG. 1B illustrates the result of the partitioning of each virtual network V0 and V1. It is significant to note that by providing partitions based on ports of a root switch within each virtual network of the network of FIG. 1A, the combinational complexity has been reduced from determining a topology of a twenty node network to determining topologies of five smaller networks, the largest of which is a five node network, and then stitching and/or overlaying these topologies to form the topology of the original network. Additionally, as noted above, by finding all of the simply connected nodes to a root switch, the address tables that are lacking information can be augmented to include this newly discovered connectivity information, thereby further simplifying the subsequent connectivity determinations.

One of skill in the art will recognize that the above partitioning of networks can be applied recursively to similarly divide each partition into smaller partitions. In FIG. 1B, for example, the five node partition {B, E, I, R, S} at port 3 of switch A can be further partitioned by determining that switch B is directly connected to this port, defining switch B as a root switch of a lower level partition, and determining the simply connected nodes to each port of switch B. In this manner, the complexity is further reduced from finding a topology of a five node network to finding a topology of a pair of two node networks. In like manner, the four node partition {I, J, N, Q} off port 1 of switch H can be partitioned based on the sets of nodes associated with the ports of switch N; and, the three node partition off port 3 of switch H can be partitioned based on the nodes associated with the ports of switch M.

In the same manner as detailed above, as each lower partition is created, the addressing tables of the nodes can be augmented with the newly discovered connectivity information, thereby progressively simplifying the process of topology determination by filling in as much information as possible.

Figure 2:
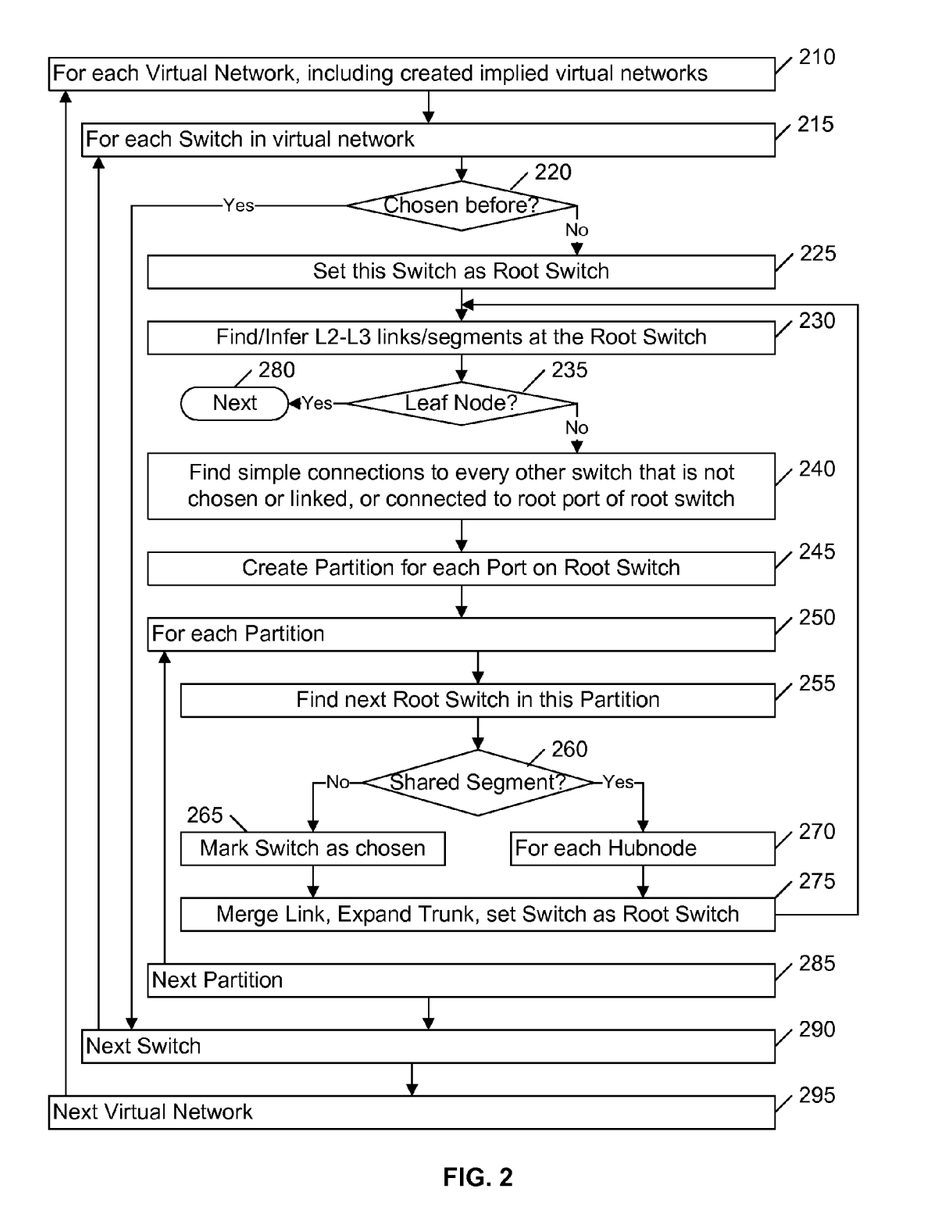
FIG. 2 illustrates an example flow diagram for inferring network topology in accordance with this invention.

FIG. 2 illustrates an example flow-diagram for finding the topology of a network in accordance with this invention.

The loop 210-295 is applied for each expressly defined virtual network in the overall network, as well as any other identified independent networks, herein termed implied virtual networks.

The loop 215-290 is provided to assure that the connectivity of all switches within the virtual network is determined; if a switch's connectivity has been addressed, the processing of this loop is bypassed, at 220. The as-yet-unprocessed switch is set as the current root switch, at 225. Generally, after selecting a first root switch from the virtual network, the only time a switch will arrive at block 230 from block 225 is when the switch is not simply connected to the selected root switch. For example, in virtual network V1, if switch H is selected as the first root switch, the switches F, G, and P will remain unchosen after the connectivity of all of the other nodes that are simply connected to switch H have been determined.

In setting up the order of switches to be processed by the loop 215-290, any of a variety of techniques can be used for selecting the first root switch, including a random selection. Generally, due to the combinatorial nature of the topology determining process, the best root switch is the switch whose largest partition is smaller than any other switch's largest partition. As such, if the address forwarding tables are known to be substantially complete, the switch whose longest address table is smaller than any other switch's longest address table would generally be preferred. If the completeness of the address forwarding table is unknown, a switch with many ports and a fairly uniform distribution of addresses among the ports would generally be preferred to a switch with few ports, or a switch with a skewed distribution of addresses among the ports. Other selection criteria may be used, based on other available information. For example, if spanning tree data is available, the root switch of the spanning tree may be an appropriate choice.

As detailed further below, the subsequent process beginning at 230 attempts to find the next-root switch that is directly connected to each of the ports of the current root switch. In the example embodiment of FIG. 2, each of these root switches is recursively processed from this point to determine the directly connected root switch from each of its ports, and this recursion is repeated for each subsequently determined root switch. One of ordinary skill in the art will recognize that other techniques for determining the topology of each partition off the ports of a root switch may also be used.

At 230, the ports of the root switch are assessed to determine whether this port, at the OSI data link layer (Layer 2), is coupled to one or more devices at the OSI network layer (Layer 3), rather than to another switch. The following table of each port is assessed to determine if the port is coupled to one or more switches; if not, a Layer 3 connection is inferred. If there are multiple non-switch entries in the address table, a shared segment (e.g. a bridge) is inferred to provide the coupling of these multiple devices to the port.

If, at 235, this new root switch is a leaf node, i.e. a node with no further switches coupled to its non-root ports, the processing of the current partition is completed. The 'next' block 280 is used to indicate that either the next partition 285, or the next switch 290, will be processed, depending upon how this branch was reached during the recursive processing.

At 240, each switch that has not yet been identified as a root switch or a switch that is linked to the root switch is assessed to determine its connectivity to the root switch. As noted above, this determined can be made quickly using rule set(1) above. If a switch is determined to be simply connected to the root port of the root switch, that switch is marked as a potential member of a shared segment with this root switch.

At 245, all of the other switches that were determined, at 240, to be simply connected to non-root ports of the root switch are assessed to determine the port to which each switch is connected, using Through-Set and other techniques discussed above with respect to FIGS. 1B and 1C. Preferably, as noted above, the port on each switch that provides this simple connection to the root switch is identified as the root port of that switch; therefore, as the lower level partitions are being processed, only the Through-Sets of the root ports of the switches need to be compared to the Through-Sets of the ports on the root switch to make this determination. In this manner, these remaining switches are partitioned based on the port of the current root switch, and the address table of each port is augmented to include any newly discovered simple connections to that port.

The loop 250-285 is structured to process each partition to determine the next root switch, or next shared segment of switches, that is directly connected to the port providing this partition.

In accordance with one aspect of this invention, at 255, the determination of a direct connection is substantially simplified by eliminating each of the switches that cannot be directly connected to the port of the root switch corresponding to this partition. It can be shown that two ports p and q cannot be directly coupled if:

$$AFT(p) \cap AFT(q) \neq 0 \qquad (2)$$

Because each switch has an identified root port that provides the simple connection to the root switch, only the intersection of the forwarding table of this root port and the current port on the root switch needs to be determined to eliminate the switches that cannot be coupled to the current port. For example, as detailed above, in FIG. 1C, port 1 of switch R is known to be the port that provides the simple connection to port 3 of root switch A. The intersection of the forwarding table of port 1 of switch R {A, B, C, E} and port 3 of switch A {B, E, I, S, R} (as augmented when switches I and R were determined to be simply connected to port A) is not null, and therefore switch R is eliminated from further processing for determining a direct connection to port 3 of switch A. In like manner, switches E, I, and S can also be eliminated, thereby leaving only port 1 of switch B as the only port that can be directly connected to port 3 of switch A.

After filtering all of the ports that cannot be directly connected to the port of the root switch that provides the partition, if more than one port remains, conventional techniques such as taught by Lowekamp and Breitbart are applied to determine which one of the remaining ports is directly connected.

If a direct connection to the current port of the root switch cannot be found directly, or if there is uncertainty in the determination, other sources of connectivity information may be used to further narrow the field of potential next root switches. For example, a number of tools exist for discovering 'neighbors' in a network, such as CDP (Cisco Discovery Protocol) and others. Similarly, spanning-tree data is often available from nodes that use spanning-tree routing algorithms. If such information is available, it is used to resolve ambiguities, and/or validate inferences made in the above processes. For example, the 'spanning-tree cost' of each node can be used to identify the most likely next root switch; or, any node that is placed in a blocking mode by the spanning-tree routing process can be ignored as a candidate next root switch. Optionally, depending upon its type and quality, such data may be used to bypass the above processes for any partition whose topology is well defined by this data.

If a unique next-root, or next-shared-segment, cannot be found, an elimination and priority ordering scheme is preferably used to select the next-root from the remaining simply connected switches. The aforementioned AFT-Intersection test (2) is applied to eliminate any switch whose root port cannot be directly connected to the current port of the root switch. From the remaining switches, eliminate any switch that has a simple connection on its root port with another remaining switch, because this would imply that this other switch is between the root switch and this switch. If more than one switch remains after this elimination, the remaining switches are assigned a 'score', typically based on a heuristic assessment of ports that are likely to be connected together, and the next root switch is selected based on this score. If multiple switches have the same score, one is selected arbitrarily.

The following example heuristic priority scheme has been shown to be effective:

1. The address table of the root port of the candidate switch includes the root switch, AND the address table of the current port of the root switch includes the candidate switch.

2. The Through-Set intersection of the root port of the candidate switch and the current port of the root switch is null.

3. The address table of the root port of the candidate switch includes the root switch, or, the address table of the current port of the root switch includes the candidate switch.

If, at 260, a single switch is identified as the next root switch, that switch is selected and marked as such, at 265. If a plurality of switches are identified as a shared segment that is connected to the port of the current root switch, then each of the switches in the shared segment is identified as a hub node and processed as the next root switch, at 270.

At 275, the direct link between the port on the root switch and the root port of the new root switch is merged with the links that have been determined thus far. If the link corresponds to a trunk, each physical link corresponding to this logical aggregate is merged.

Figure 3:
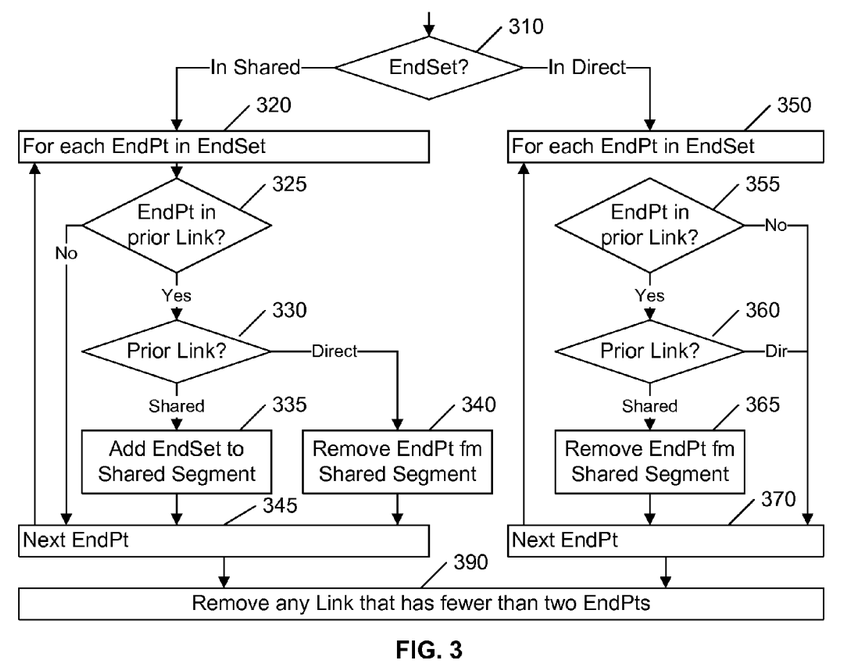
FIG. 3 illustrates an example flow diagram for prioritized merging of links in accordance with this invention.

FIG. 3 illustrates an example flow diagram for a prioritized merging of links. Generally, shared segments are inferred when there is insufficient information available to infer a simple direct connection; preferably, if a direct connection inference conflicts with a shared segment inference, the direct connection inference takes priority.

As each link is inferred and added to the database of inferred links, it is compared with previously inferred links to determine if a priority inference should be applied. The processing is dependent upon whether the new link is inferred to be a direct connection or a shared segment, at 310. If the new link is a direct connection, the loop 350-370 checks each of the endpoints to see if it is included in a prior inferred link, at 355. If, at 360, the prior inferred link is a shared segment, this endpoint is removed from the inferred shared segment, at 365.

If, at 310, the new link is a shared segment, the loop 320-345 checks each of the endpoints to see if it is included in a prior inferred link, at 325. If the prior link is a direct connection, this endpoint is removed from this new shared segment inference, at 340. If the prior link is also a shared segment, the new shared segment is merged with the prior shared segment, at 335.

After processing all of the endpoints, if any inferred link has been reduced to having fewer than two members, it is deleted, at 390.

By partitioning the network into smaller and smaller partitions, based on the nodes that are simply connected to the ports of each determined root switch, the task of determining the connectivity of a network is reduced to a recursive determination of the link to a next root switch from each port, and a stitching together of these links. Because each of the partitions are generally substantially smaller than the next higher level network, and because the creation of each partition facilitates a completion of each port's address table, the task of deducing/inferring connectivity in the presence of limited information is substantially reduced and/or the consequences of an erroneous inference are limited in scope.

One of skill in the art will recognize that the techniques disclosed herein may be applied in a variety of scenarios other than the paradigm scenario detailed above. For example, networks are often partitioned into substantially independent networks using techniques other than virtual LANs. The HVNES product from OPNET Technologies, Inc., allows multiple VNE (Virtual Network Environment) servers to be arranged in a hierarchical master/slave arrangement, wherein each slave network is disparately managed, with minimal connectivity between or among nodes of the slave networks. In such an environment, each slave network can be independently analyzed to infer the topology within its domain, while a smaller 'upper-level' network comprising only the nodes that interconnect the slave domains can be analyzed to provide a topology for 'stitching together' these slave networks. Preferably, a priority merging of inferred links would be used, such as discussed above with regard to FIG. 3, wherein links that are determined at the upper level are given priority to those discovered within the slave networks.

Figure 4:
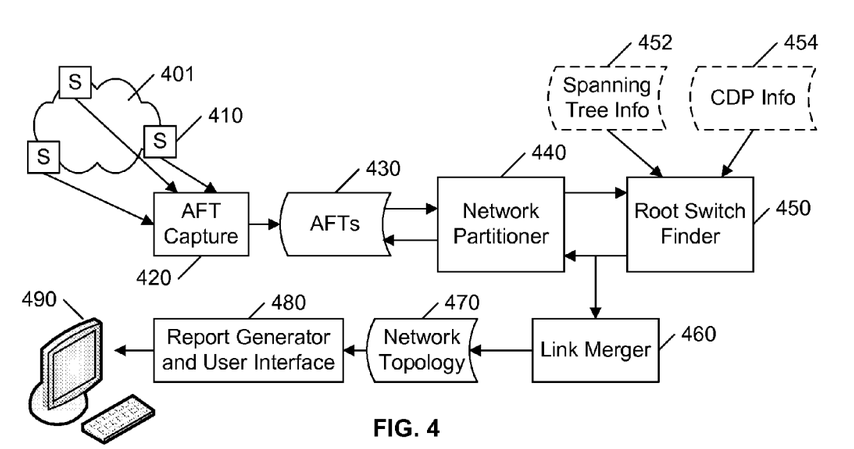
FIG. 4 illustrates an example block diagram of a link inference system in accordance with this invention.

FIG. 4 illustrates an example block diagram of a link inference system in accordance with this invention. This system may be a hardware embodiment, a software embodiment, or a combination of both.

The preferred system includes a network partitioning component 440 that is configured to partition an input network into partitions based on a given partitioning criteria, such as partitions based on membership in a virtual network, or membership based on being simply connected to ports of a particular switch. Preferably, the network partitioning component 440 is configured to determine each set of simply connected nodes based on the aggregate AFT tests (1), detailed above.

In a recursive embodiment of this invention, the system also includes a root switch finder 450 that is configured to identify a subsequent/next root switch associated with each of the partitions identified by the network partitioner 440. Preferably, the root switch finder component 450 is configured to eliminate candidate nodes in this determination by applying the ATF intersection rule (2) to each root port of each candidate switch. Also preferably, the root switch finder 450 includes heuristic tests that are configured to identify a likely next root port from among the candidate nodes, as detailed above.

As each next root switch is determined, a link merger 460 receives the determined connectivity to this next root switch from the current root switch and merges this information with prior determined links to create a network topology 470, using, for example, the example flow diagram of FIG. 3. Optionally, as discussed above, the root switch finder 450 is also preferably configured to use ancillary information, such as spanning tree information 452 and CDP information 454, to validate and/or determine or infer the next root switch associated with each partition. As each next subsequent root switch is determined, the network partitioner 440 is preferably configured to partition the remaining nodes according to their connectivity to ports of the current root switch.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:

receiving, at a network analysis machine, a plurality of address forwarding tables that define address sets associated with ports of nodes in a network, selecting a root node from the nodes of the network, creating, by the network analysis machine, a partition associated with each port of the root node that includes each of the other nodes of the network that are simply connected to the port, based on the address forwarding tables, if any nodes remain that have not been included in at least one partition, selecting a node from among the remaining nodes as the root node and repeating the creating of partitions associated with each port of the root node that includes each of the other nodes of the network that are simply connected to the port, until each node of the network has been included in at least one partition, determining, by the network analysis machine, a topology of each partition based at least in part on the address forwarding tables, and merging, by the network analysis machine, the topologies of the partitions to determine a topology of the network.

2. The method of claim 1, including defining an aggregate forwarding table associated with each node that includes the address sets associated with each of the ports of the node, wherein determining the other nodes of the network that are simply connected to each port of the root node includes identifying a non-null intersection between the aggregate forwarding table of the root node and the aggregate forwarding table of the other node.

3. The method of claim 1, wherein the network corresponds to a virtual network of a plurality of virtual networks that are included in a larger network, and the method includes:

processing each virtual network as the network of claim 1 to determine a topology of each virtual network, and merging the topologies of the virtual networks to determine a topology of the larger network.

4. The method of claim 3, including determining the nodes that are included in each virtual network.

5. The method of claim 4, including identifying one or more nodes that do not include an explicit identification of an associated virtual network as being included in at least one default virtual network.

6. The method of claim 4, including defining a plurality of default virtual networks based on a plurality of protocols, and identifying one or more nodes that do not include an explicit identification of an associated virtual network as being included in at least one of the plurality of default virtual networks based on a protocol associated with the node.

7. The method of claim 4, including defining an aggregate forwarding table associated with each node that includes the address sets associated with each of the ports of the node, wherein determining the other nodes of the network that are simply connected to each port of the root node includes identifying a non-null intersection between the aggregate forwarding table of the root node and the aggregate forwarding table of the other node.

8. The method of claim 1, including identifying any OSI Level-3 devices that are connected to each port of the root node.

9. The method of claim 1, wherein:

one or more of the address forwarding tables includes an identification of an aggregate interface that includes a plurality of associated ports, and determining the topology of each partition includes determining connections of aggregate interfaces within the partition, if any, and identifying a corresponding set of connections for each of the plurality of ports associated with each aggregate interface.

10. The method of claim 1, wherein determining the topology of each partition includes:

determining a set of second-level root nodes, each second-level root node being directly coupled to a corresponding port of the root node, creating a set of second-level partitions, each second-level partition being associated with each port of each second level root node and includes each of the other nodes of the network that are simply connected to the port of the second-level root node, determining a topology of each second-level partition, and merging the topology of each second-level partition to determine the topology of each partition.

11. The method of claim 1, wherein determining the topology of one or more partitions includes iteratively determining topologies of lower-level partitions, each lower-level partition including nodes of the network that are simply connected to a port of a root node in a higher-level partition.

12. The method of claim 11, wherein determining the topology of one or more of the lower-level partitions includes using sources of connectivity information beyond the address forwarding tables.

13. The method of claim 12, wherein at least one source of connectivity information includes at least one of Cisco Discovery Protocol (CDP) and a spanning-tree routing algorithm.

14. The method of claim 11, including determining the root node at each level of partitioning by identifying one or more nodes that are likely to be directly connected to each port of a corresponding root node at a next higher level of partitioning.

15. The method of claim 14, wherein identifying the one or more nodes includes applying an address forwarding table intersection test to eliminate any node whose root port cannot be directly connected to the port of the corresponding root node at the next higher level of partitioning.

16. The method of claim 15, wherein identifying the one or more nodes includes applying an aggregate address forwarding table intersection test to eliminate any node that has a simple connection on its root port with another remaining node.

17. The method of claim 16, wherein identifying the one or more nodes includes applying a heuristic priority scheme to identify ports that are likely to be connected together.

18. The method of claim 17, wherein applying the heuristic priority scheme for identifying the one or more nodes includes determining whether:
the address forwarding table of the root port of the node includes the root node;
the address forwarding table of the port of the root node includes the node; and
a Through-Set intersection of the root port of the node and the port of the root node is null.

19. A system comprising:
a memory that is configured to store a plurality of address forwarding tables that define address sets associated with ports of nodes in a network,
a network partitioner that is configured to:
select a root node from the nodes of the network,
create a partition associated with each port of the root node that includes each of the other nodes of the network that are simply connected to the port based on the address forwarding tables,
select a node from among the remaining nodes as the root node if any nodes remain that have not been included in at least one partition, and repeat the creating of partitions associated with each port of the root node that includes each of the other nodes of the network that are simply connected to the port until each node of the network has been included in at least one partition, and
determine a topology of each partition based at least in part on the address forwarding tables, and
a link merger that is configured to merge the topologies of the partitions to determine a topology of the network.

20. The system of claim 19, wherein the network partitioner is configured to:
define an aggregate forwarding table associated with each node that includes the address sets associated with each of the ports of the node, and
determine the other nodes of the network that are simply connected to each port of the root node by identifying a non-null intersection between the aggregate forwarding table of the root node and the aggregate forwarding table of the other node.

21. The system of claim 19, wherein the network corresponds to a virtual network of a plurality of virtual networks that are included in a larger network, and the network partitioner is configured to:
process each virtual network as the network of claim 19 to determine a topology of each virtual network, and
merge the topologies of the virtual networks to determine a topology of the larger network.

22. The system of claim 19, wherein the network partitioner is configured to determine the nodes that are included in each virtual network.

23. The system of claim 22, wherein the network partitioner is configured to identify one or more nodes that do not include an explicit identification of an associated virtual network as being included in at least one default virtual network.

24. The system of claim 22, wherein the network partitioner is configured to:
define a plurality of default virtual networks based on a plurality of protocols, and
identify one or more nodes that do not include an explicit identification of an associated virtual network as being included in at least one of the plurality of default virtual networks based on a protocol associated with the node.

25. The system of claim 22, wherein the network partitioner is configured to:
define an aggregate forwarding table associated with each node that includes the address sets associated with each of the ports of the node, and
determine the other nodes of the network that are simply connected to each port of the root node by identifying a non-null intersection between the aggregate forwarding table of the root node and the aggregate forwarding table of the other node.

26. The system of claim 19, wherein the network partitioner is configured to identify any OSI Level-3 devices that are connected to each port of the root node.

27. The system of claim 19, wherein:
one or more of the address forwarding tables includes an identification of an aggregate interface that includes a plurality of associated ports, and
the network partitioner is configured to determine the topology of each partition by determining connections of aggregate interfaces within the partition, if any, and identifying a corresponding set of connections for each of the plurality of ports associated with each aggregate interface.

28. The system of claim 19, including a root switch finder that is configured to determine a set of second-level root nodes, each second-level root node being directly coupled to a corresponding port of the root node, and wherein the network partitioner is configured to:
create a set of second-level partitions, each second-level partition being associated with each port of each second level root node and includes each of the other nodes of the network that are simply connected to the port of the second-level root node,
determine a topology of each second-level partition, and
merge the topology of each second-level partition to determine the topology of each partition.

29. The system of claim 28, wherein the root switch finder is configured to determine at least one of the set of second-level root nodes by using sources of connectivity information beyond the address forwarding tables.

30. The system of claim 29, wherein at least one source of connectivity information includes at least one of Cisco Discovery Protocol (CDP) and a spanning-tree routing algorithm.

31. The system of claim 28, wherein the root switch finder is configured to determine at least one of the set of second-level root nodes by identifying one or more nodes that likely to be directly connected to each port of a corresponding root node at a next higher level of partitioning.

32. The system of claim 31, wherein the root switch finder is configured to determine at least one of the set of second-level root nodes by applying an address forwarding table intersection test to eliminate any node whose root port cannot be directly connected to the port of the corresponding root node at the next higher level of partitioning.

33. The system of claim 32, wherein the root switch finder is configured to determine at least one of the set of second-level root nodes by applying an aggregate address forwarding table intersection test to eliminate any node that has a simple connection on its root port with another remaining node.

34. The system of claim 33, wherein the root switch finder is configured to determine at least one of the set of second-level root nodes by applying a heuristic priority scheme to identify ports that are likely to be connected together.

35. The system of claim 34, wherein applying the heuristic priority scheme for identifying the one or more nodes includes determining whether:
   the address forwarding table of the root port of the node includes the root node;
   the address forwarding table of the port of the root node includes the node; and
   a Through-Set intersection of the root port of the node and the port of the root node is null.

36. The system of claim 19, wherein the network partitioner is configured to iteratively determine topologies of lower-level partitions, each lower-level partition including nodes of the network that are simply connected to a port of a root node in a higher-level partition.

37. A computer program stored on a non-transient computer readable medium that, when executed, is configured to cause a processor to:
   receive a plurality of address forwarding tables that define address sets associated with ports of nodes in a network,
   select a root node from the nodes of the network,
   create a partition associated with each port of the root node that includes each of the other nodes of the network that are simply connected to the port, based on the address forwarding tables,
   select a node from among the remaining nodes as the root node if any nodes remain that have not been included in at least one partition, and repeat the creating of partitions associated with each port of the root node that includes each of the other nodes of the network that are simply connected to the port until each node of the network has been included in at least one partition, and
   determine a topology of each partition based at least in part on the address forwarding tables, and
   merge the topologies of the partitions to determine a topology of the network.

38. The program of claim 37, wherein the program is configured to cause the processor to:
   define an aggregate forwarding table associated with each node that includes the address sets associated with each of the ports of the node, and
   determine the other nodes of the network that are simply connected to each port of the root node by identifying a non-null intersection between the aggregate forwarding table of the root node and the aggregate forwarding table of the other node.

39. The program of claim 37, wherein the program is configured to cause the processor to identify any OSI Level-3 devices that are connected to each port of the root node.

40. The program of claim 37, wherein:
   one or more of the address forwarding tables includes an identification of an aggregate interface that includes a plurality of associated ports, and
   the program is configured to cause the processor to determine the topology of each partition by determining connections of aggregate interfaces within the partition, if any, and identifying a corresponding set of connections for each of the plurality of ports associated with each aggregate interface.

41. The program of claim 37, wherein the program is configured to cause the processor to:
   determine a set of second-level root nodes, each second-level root node being directly coupled to a corresponding port of the root node,
   create a set of second-level partitions, each second-level partition being associated with each port of each second level root node and includes each of the other nodes of the network that are simply connected to the port of the second-level root node, and
   determine a topology of each second-level partition, and
   merge the topology of each second-level partition to determine the topology of each partition.

42. The program of claim 37, wherein the program is configured to cause the processor to iteratively determine topologies of lower-level partitions, each lower-level partition including nodes of the network that are simply connected to a port of a root node in a higher-level partition.

* * * * *